Patented Jan. 3, 1950

2,493,724

UNITED STATES PATENT OFFICE 2,493,724

QUICK-DRYING WRITING INKS

Raymond Lemuel Mayhew, Phillipsburg, N. J., assignor to General Aniline & Film Corporation, New York, N. Y., a corporation of Delaware No Drawing. Application July 11, 1945, Serial No. 604,507

11 Claims. (Cl. 106—22)

This invention relates to the preparation of bright blue to bluish-green writing inks of the quick-drying type.

It is known to prepare brightly colored quick-drying inks by the use of dyestuffs and caustic alkali, the penetrative quality of the caustic alkali causing the ink to be rapidly absorbed by the paper. Up to the present, however, a commercially satisfactory bright blue to bluish-green writing ink of this kind has not been produced. This has been due to the instability to caustic alkali of the dyestuffs heretofore employed in the formulation of the inks, the dyestuffs undergoing breakdown during storage to decomposition products which either caused sludge formation in the ink or gave a color thereto radically different in shade from that of the original solution of the dyestuff.

It is an object of the present invention to provide bright blue to bluish-green caustic alkali-containing quick-drying writing inks of improved color stability. Further objects will become apparent as the description proceeds.

I have found that the above objects may be accomplished by employing as dyestuffs for quick-drying writing inks of the aforementioned type, phthalocyanine sulfonamides which are soluble in dilute aqueous caustic alkali.

The phthalocyanines are tetraazaporphins in which each of the four pyrrole nuclei is fused to an arylene nucleus, e. g., phenylene, phenyl-phenylene, naphthylene, anthrylene, etc., of which phthalocyanine itself (tetrabenzotetraazoporphin) is a well-known example. The phthalocyanine molecule may be metal free or contain a metal in complex combination, for example, copper, cobalt, nickel, iron aluminum, etc.

The phthalocyanine sulfonamides constituting the dyestuffs for the inks of the present invention may be prepared by reacting the corresponding phthalocyanine sulfonylchlorides with ammonia, or with a primary or secondary amine, the sulfonamide groups from which induce solubility of the phthalocyanine in dilute aqueous caustic alkali, e. g., caustic soda, caustic potash, caustic lithia, etc. These primary and secondary amines may be aliphatic, carbocyclic or heterocyclic in character. Suitable amines are for example, methylamine, ethylamine, propylamine, butylamine, a mono- or polyhydroxyalkylamine, e. g., monoethanolamine, diethanolamine, 2-amino-2-methyl-1,3-propanediol [1,1-bis(hydroxymethyl)-1-aminoethane], 2-amino-2-ethyl-1,3-propanediol [1,1-bis(hydroxymethyl)-1-aminopropane], tris(hydroxymethyl)aminomethane, glucosamine (2-aminoglucose), 1-aminoglucose, 1-methylamino-2,3-propanediol, 1-ethylamino-2,3-propanediol; also, cyclohexylamine, aniline, 4-chloroaniline, o-, m- and p-aminophenol, o-, m- and p-toluidine, o-, m- and p-xylidine, 2-, 3- and 4-aminopyridine, morpholine, 1-(3'-aminophenyl)-3-methyl-5-pyrazolone, etc. The reactions may be carried out at elevated temperatures, preferably, however, at room or even lower temperatures, and in aqueous solution or suspension, in the presence of an organic solvent such as alcohol, acetone, nitrobenzene, etc., as may be found most suitable, or in some instances in the complete absence of a diluent.

The starting phthalocyanine sulfonylchlorides employed in the preparation of the phthalocyanine sulfonamides may be obtained by reacting chlorosulfonic acid with the corresponding phthalocyanines at an elevated temperature as described in U. S. P. 2,219,330. They may also be made from the corresponding phthalocyanine sulfonic acids or their salts by treatment with phosphorus pentachloride. One to four or more sulfonylchloride groups may be present on the aromatic nuclei of the starting phthalocyanines, in consequence of which the number of the sulfonamide groups on the resulting phthalocyanine products may be varied. In some instances, not all these sulfonylchloride groups may be converted in the reaction to sulfonamide groups, in which case the phthalocyanine sulfonamide will contain on the arylene nuclei one or more sulfonic acid groups, either free or as the amine or the ammonium salt. The arylene nuclei of the phthalocyanine sulfonamides may also have attached thereto substituents such as halogen atoms, e. g., chlorine, or amino or carboxy groups, etc.

A preferred group of dyestuffs for the writing inks of the present invention are the phthalocyanine sulfonamides derived by reaction of the di-, tri- or tetrasulfonylchlorides of copper phthalocyanine with ammonia, tris(hydroxymethyl) aminomethane or 2-aminopyridine, at room temperature.

The following examples are illustrative of the preparation of phthalocyanine sulfonamides useful as dyestuffs for the preparation of the quick-drying inks of the present invention. Parts are by weight unless otherwise noted.

*Example I*

Fifty parts of copper phthalocyanine tetrasulfonylchloride in the form of a presscake are slowly added with stirring to 50 parts of a saturated aqueous solution of ammonia (previously cooled to 0° C. by means of an ice bath). Care is taken that the temperature of the mixture does not rise above 10° C. during the addition. Stirring is then continued for several hours at 10° C. until dissolution is complete, whereupon the temperature is allowed to rise gradually to room temperature. The resulting solution containing excess ammonia is then evaporated to dryness and the phthalocyanine sulfonamide obtained as a dry powder.

Alternatively, the excess ammonia may be evaporated from the resulting solution and the latter then poured into 100 volumes of a 10% hydrochloric acid solution. The dyestuff precipitated is filtered and dried.

In either case a dark blue powder is obtained which is soluble in dilute aqueous caustic alkali with brilliant blue coloration.

*Example II*

Ten parts of copper phthalocyanine tetrasulfonylchloride is stirred as a dry powder into 50 parts of concentrated ammonia solution and stirring continued for several hours at room temperature until dissolution is complete. The resulting solution of the dyestuff and excess ammonia is then evaporated to dryness. The copper phthalocyanine sulfonamide obtained as a dry powder is similar in characteristics to the corresponding product of Example 1.

*Example III*

Fifty parts of copper phthalocyanine tetrasulfonylchloride is slowly stirred into 50 parts of anhydrous liquid ammonia contained in a stainless steel pressure bomb. This mixture is then agitated at room temperature for several hours. The ammonia is then blown off and the product obtained is dried and powdered. There is obtained a bright blue dyestuff which is soluble in water and dilute caustic alkali solution.

*Example IV*

Ten parts of copper phthalocyanine tetrasulfonylchloride is stirred as a dry powder into a water suspension of aniline and while stirring at room temperature a 10% sodium carbonate solution is added until the reaction is alkaline. Stirring is continued for several hours at room temperature, whereupon the resulting dyestuff may be isolated by evaporation of the solution to dryness as in Example II. It is quite stable in dilute caustic alkali solution.

*Example V*

To a solution of 10 parts of tris(hydroxymethyl)-aminomethane; NH₂C(CH₂OH)₃ in 50 parts of water is slowly added with stirring 10 parts of copper phthalocyanine tetrasulfonylchloride. After stirring several hours at room temperature, the reaction mixture is evaporated to dryness as in Example 2.

*Example VI*

A mixture of:

| | Parts |
|---|---|
| Copper phthalocyanine tetrasulfonylchloride | 10 |
| 2-amino-2-methyl-1-propanol | 10 |
| Water | 50 | is stirred for 10-15 hours at room temperature. This solution is then stirred into 100 volumes of 10% hydrochloric acid and the precipitated dyestuff filtered and dried.

*Example VII*

A mixture of:

| | Parts |
|---|---|
| Copper phthalocyanine tetrasulfonylchloride | 10 |
| 2-amino-2-methyl-1,3-propanediol | 10 |
| Water | 50 | prepared by dissolving the hydroxy amine in the water and adding the tetrasulfonylchloride thereto with stirring is stirred at room temperature for 10-14 hours. The resulting solution is poured into 250 volumes of 10% hydrochloric acid solution and the precipitate filtered and dried. A greenish-blue powder is obtained which is soluble in dilute caustic alkali solution with a brilliant bluish-green coloration.

*Example VIII*

A mixture of:

| | Parts |
|---|---|
| Copper phthalocyanine tetrasulfonylchloride | 10 |
| Diethanolamine | 10 |
| Water | 50 | is stirred for several hours at room temperature and the resulting dyestuff precipitated with 10% hydrochloric acid, filtered and dried.

*Example IX*

Ten parts of copper phthalocyanine tetrasulfonylchloride are slowly stirred into a solution of 10 parts of 2-amino-pyridine in 100 volumes of nitrobenzene and the resulting mixture stirred for 10-12 hours at room temperature. The nitrobenzene is then removed from the reaction mixture by means of steam distillation and the resulting solution evaporated to a thick syrupy residue. Upon cooling the residue is poured into 100 volumes of 10% hydrochloric acid and the precipitate filtered and dried. A brilliant blue dyestuff is obtained.

*Example X*

Ten parts of copper phthalocyanine tetrasulfonylchloride are stirred into a solution of 6 parts of 1-(3'-aminophenyl)-3-methyl-5-pyrazolone and 5.5 parts of sodium acetate in 50 parts of acetone. The mixture is then stirred at room temperature until the reaction is complete, whereupon the acetone is evaporated and the dyestuff precipitated with 10% hydrochloric acid in the manner of the previous example, filtered and dried.

*Example XI*

Ten parts of copper phthalocyanine tetrasulfonylchloride is stirred into 50 parts of water in which has been dissolved 10 parts of morpholine. The whole mixture is then stirred at room temperature for several hours after which the mixture is stirred into 100 volumes of 10% hydrochloric acid. The resulting precipitate is filtered and dried. A greenish-blue powder is obtained which is soluble in dilute aqueous caustic alkali.

*Example XII*

A mixture of 50 parts of aluminum phthalocyanine tetrasulfonylchloride presscake and 50 parts of concentrated ammonia solution is stirred for several hours at room temperature, whereupon the excess ammonia is evaporated and the resulting solution stirred into 100 volumes of 10% hydrochloric acid. The precipitated dyestuff is filtered and dried. It is somewhat greener in shade than the corresponding copper phthalocyanine derivative.

Example XIII

Following the procedure of Example XII, the corresponding dyestuff is prepared using equal parts of cobalt phthalocyanine tetrasulfonylchloride and concentrated ammonia solution. The dyestuff is a green powder.

Example XIV

Following the procedure of Example II, 10 parts of copper phthalocyanine containing chlorine atoms in addition to sulfonylchloride groups was reacted with 50 parts of saturated ammonia solution and worked up to a product similar in character to that of Example II.

Example XV

Twenty parts of copper phthalocyanine sulfonylchlorides (a mixture containing a substantial proportion of the di- and trisulfonylchloride derivatives) is stirred into 100 parts of a saturated ammonia solution and stirring continued for 12 hours, at room temperature, whereupon the solution is evaporated to dryness. The bright blue powder obtained is somewhat less soluble in dilute aqueous caustic alkali solution than the corresponding dyestuff of Example I.

Example XVI

Twenty parts of copper phthalocyanine monosulfonylchloride is stirred into 100 parts of water in which has been dissolved 10 parts of tris(hydroxymethyl) aminomethane. This mixture after being stirred for several hours at room temperature is poured into 250 volumes of 10% hydrochloric acid and the resulting precipitate filtered and dried. A blue powder less soluble in dilute aqueous caustic alkali than the dyestuff of Example 15 is obtained.

Example XVII

Twenty parts of copper phthalocyanine sulfonylchlorides (a mixture containing a substantial proportion of the di- and trisulfonylchloride derivatives) is stirred into 100 parts of water containing 20 parts of tris(hydroxymethyl)aminomethane and the mixture stirred overnight at room temperature. The dyestuff is precipitated with 10% hydrochloric acid as in the preceding examples, filtered and dried. A bright blue powder is obtained which is somewhat less soluble in dilute aqueous caustic alkali than the corresponding product from copper phthalocyanine tetrasulfonylchloride.

Quick-drying inks may be prepared in accordance with the invention by dissolving a small amount of one of the phthalocyanine sulfonamides in a dilute aqueous solution of a caustic alkali, e. g., sodium, potassium or lithium hydroxide. Sodium hydroxide generally is to be used because of its lower cost. The concentration of the dyestuff and caustic alkali may be varied depending on the depth of shade and rate of drying desired in the ink. The caustic alkali should be used in concentrations corresponding to those disclosed in U. S. Patent 1,932,248 and, as there described in terms of sodium hydroxide, it should not be below 0.1% and generally may be about 0.5% to about 2% or slightly more.

Other ingredients found desirable in the art and which do not interfere with the functioning of the dyestuffs may be contained in the inks. As described in the aforesaid U. S. Patent 1,932,248, starch may be used for preventing feathering of the ink on the paper, bentonite for improving its flow characteristics and, where required by usage in the trade for greater permanency, alkali soluble metal salts which on exposure to light give colored oxides, e. g., ammonium metavanadate or potassium ferro-cyanide. Small amounts of wetting agents resistant to dilute caustic alkali may be used to further speed up the absorption of the ink by the paper, for example, a sulfated higher alcohol of which a commercial representative is Gardinol WA (sodium salt of technical lauryl sulfate). A hygroscopic agent, such as ethylene glycol, diethylene glycol, glycerol, etc., may be added to the ink to keep the point of the pen moist when exposed to the atmosphere.

A specific formula for the preparation of quick-drying writing inks in accordance with the invention is as follows:

| | Parts |
|---|---|
| Copper phthalocyanine sufonamide (product of Example I, isolated solely by evaporation) | 2 |
| Sodium hydroxide | 1.6 |
| Sodium salt of technical lauryl sulfate | 0.01 |
| Ammonium metavanadate | 0.35 |
| Ethylene glycol | 0.7 |
| Water | 100 |

The above solution represents an attractive greenish-blue writing ink of excellent stability. It is permanent in character and the writing therefrom is still legible after soaking the paper in water for 24 hours. Depending on the particular phthalocyanine sulfonamide employed as the colorant, the shade of the ink may vary from blue to bluish-green. For example, if, in the above formula, the dyestuffs of Examples IV and XII are employed, inks of a somewhat greener shade are obtained.

As various other embodiments of the invention will occur to those skilled in the art, it is not intended that the scope of the patent be limited except as is required by the prior art and the appended claims.

I claim:

1. A quick-drying writing ink comprising in solution a copper phthalocyanine of the benzene series having attached to the phenylene nuclei a plurality of aliphatic sulfonamide groups, a hygroscopic polyhydric alcohol, water and caustic alkali, the content of caustic alkali in the ink being equivalent to from about 0.5–2% of sodium hydroxide.

2. A quick-drying writing ink as defined in claim 1, wherein the solution contains a wetting agent.

3. A quick-drying writing ink comprising in solution a copper phthalocyanine of the benzene series having attached to the phenylene nuclei a plurality of lower alkylsulfonamide groups, a hygroscopic polyhydric alcohol, water and caustic alkali, the content of caustic alkali in the ink being equivalent to from about 0.5–2% of sodium hydroxide.

4. A quick-drying writing ink as defined in claim 3, wherein the solution contains a wetting agent.

5. A quick-drying writing ink comprising in solution a copper phthalocyanine of the benzene series having attached to the phenylene nuclei a plurality of methylsulfonamide groups, a hygroscopic ployhydric alcohol, water and caustic alkali, the content of caustic alkali in the ink being equivalent to from about 0.5–2% of sodium hydroxide.

6. A quick-drying writing ink as defined in claim 5, wherein the solution contains a wetting agent.

7. A quick-drying writing ink comprising in solution a copper phthalocyanine of the benzene series having attached to the phenylene nuclei a plurality of methylsulfonamide groups, ethylene glycol, sodium lauryl sulfate, water and sodium hydroxide, the content of sodium hydroxide in the ink being from about 0.5–2%.

8. A quick-drying writing ink comprising in solution a copper phthalocyanine of the benzene series having attached to the phenylene nuclei a plurality of ethylsulfonamide groups, a hygroscopic polyhydric alcohol, water and caustic alkali, the content of caustic alkali in the ink being equivalent to from about 0.5–2% of sodium hydroxide.

9. A quick-drying writing ink as defined in claim 8, wherein the solution contains a wetting agent.

10. A quick-drying writing ink comprising in solution a copper phthalocyanine of the benzene series having attached to the phenylene nuclei a plurality of propylsulfonamide groups, a hygroscopic polyhydric alcohol, water and caustic alkali, the content of caustic alkali in the ink being equivalent to from about 0.5–2% of sodium hydroxide.

11. A quick-drying writing ink as defined in claim 10, wherein the solution contains a wetting agent.

RAYMOND LEMUEL MAYHEW.

REFERENCES CITED

The following references are of record in the file of this patent:

UNITED STATES PATENTS

| Number | Name | Date |
|---|---|---|
| 1,848,077 | Huffman | Mar. 1, 1932 |
| 1,932,248 | Miner et al. | Oct. 24, 1933 |
| 2,300,572 | Hoyer | Nov. 3, 1942 |

FOREIGN PATENTS

| Number | Country | Date |
|---|---|---|
| 496,663 | Great Britain | Dec. 5, 1938 |
| 520,199 | Great Britain | Apr. 17, 1940 |